United States Patent Office 2,695,920
Patented Nov. 30, 1954

2,695,920

PRODUCTION OF VINYL ARYL ETHERS

Joseph M. Wilkinson, Easton, and Edgar S. Miller, Bethlehem, Pa., assignors to General Aniline & Film Corporation, New York, N. Y., a corporation of Delaware No Drawing. Application January 4, 1952,
Serial No. 265,044

6 Claims. (Cl. 260—612)

This invention relates to vinyl aryl ethers and particularly to an improved process of preparing the same.

Vinyl aryl ethers have been prepared by several methods. For instance, vinyl phenyl ether has been prepared by heating β-bromoethyl phenyl ether with twice its weight of powdered potassium hydroxide. Temperatures as high as 290° C. were required and yields were less than 50% of the theoretical. Obviously, this method has serious limitations from the industrial standpoint. Vinyl phenyl ether, the three vinyl tolyl ethers, and vinyl 1-naphthyl ether have been prepared by a vinylation process, i. e., by the action of acetylene on phenol, the cresols, and 1-naphthol, respectively. These preparations have been described by M. F. Shostakoyskii and M. S. Burmistrova, in the "Journal of Applied Chemistry" (USSR), 15, 260–266 (1942). These authors used potassium hydroxide as a catalyst and the amount corresponded to 5–20% of the weight of phenol or cresol. However, they reported that resinification occurred during vinylation unless water was added. They recommended 10–15% of the weight of phenol or cresol as water.

The vinylation of phenolic compounds is also disclosed by Walter Reppe in his United States Patent 1,959,927 issued on May 22, 1934. In his process, Reppe employs sodium phenolate and potassium hydroxide as catalysts and methanol as a solvent. Treatment with a 2:1 mixture of acetylene and nitrogen for 20–24 hours at 180° C. and at pressures of 40–50 atmospheres is required. The necessity of operating at such extreme pressures renders the process hazardous and dangerous, and, in addition, it requires a considerable period of time for the vinylation reaction to go to completion. Furthermore, the solvent must be recovered and the final product contains a small amount of phenol as an impurity which must be removed by treatment with caustic soda. Moreover, Reppe's process is limited to phenolic compounds free of exchangeable halogen groups which might react with the alkali in an undesired manner.

To provide an improved process of preparing vinyl aryl ethers which overcomes the shortcomings of the Reppe method constitutes the object of the present invention.

We have found that in the vinylation of phenolic compounds the nitrogen in the acetylene mixture can be replaced by propane in the same percentage ratio and that such mixture eliminates the hazards of detonation. No solvent is required and, as a consequence, a solvent recovery operation is eliminated. Furthermore, the addition of water is also eliminated without sacrificing the yield. More important, the amount of resinification formed during the course of the reaction has been reduced to insignificant amounts. This resulted from the unanticipated discovery that a catalyst concentration of 25–30 weight per cent of alkali metal hydroxide based on phenolic starting material is the optimum concentration. Even 40 weight per cent of alkali metal hydroxide does not give a better yield. These concentrations of catalyst give much more dependable yields than does 20 weight per cent or less of alkali metal hydroxide. No water is added to the reaction mixture although presumably a small amount of water is present, being formed from the reaction of alkali metal hydroxide and phenol.

We have further found that a total pressure of not more than 15 atmospheres gives satisfactory yields and substantial economies of operation result because the equipment need be designed for only ¼ to ⅓ of the pressures required by former processes. In addition, the rate of reaction is rapid even at lower pressures and the time required for carrying out the reaction is reduced to 10 hours when the optimum concentration of alkali metal hydroxide is employed.

Another significant and unexpected aspect of our improved process is that chlorinated monohydric phenols are also vinylated without reacting with the alkali metal hydroxides to form undesirable resinous side-products.

The vinyl aryl ethers which may be prepared in accordance with our improved process are characterized by the following general formula:

$$CH_2=CH-O-R$$

wherein R represents the residue of a substituted or unsubstituted monohydric aromatic phenol of the benzene, naphthalene, anthracene, phenanthrene, naphthacene, chrysene, pyrene, triphenylene series, and the like.

In practicing our improved process, an autoclave is charged with a monohydric phenol and 25–30% by weight of the phenol of an alkali metal hydroxide added. The autoclave is sealed, pressure tested, and purged with dry nitrogen followed with propane. The autoclave is then sealed and heated to a temperature ranging between 175–190° C., preferably to 185° C. with agitation. Propane is then introduced to a pressure ranging from 4 to 5 atmospheres, preferably to a pressure of 70 p. s. i. g. (pounds/sq. inch-gauge pressure, approximately 5 atmospheres). Acetylene is then added to a pressure of 13 and not more than 15 atmospheres, preferably to 200 p. s. i. g. (approximately 14 atmospheres) and the reaction allowed to run for a period of time ranging from 8 to 10 hours at the aforementioned temperatures. The autoclave is allowed to cool, the gas is vented, and the product discharged. The mixture is subjected to steam distillation. The product is isolated from the distillate in the usual manner and may be further purified by distillation at atmospheric or diminished pressure.

Any type of monohydric phenol whether substituted or unsubstituted may be vinylated. As examples of such phenols, the following may be mentioned:

phenol
4-methylphenol
2-methoxyphenol
o-, m-, and p-Cresol
1,2-dimethyl-3-hydroxybenzene
1,2-dimethyl-4-hydroxybenzene
1,3-dimethyl-2-hydroxybenzene
1,3-dimethyl-4-hydroxybenzene
1,3-dimethyl-5-hydroxybenzene
1,4-dimethyl-2-hydroxybenzene
Thymol
Carvacrol
α-Naphthol
β-Naphthol
1,3-naphthol
o-Chlorophenol
p-Chlorophenol
3-hydroxybenzanthrone
4-hydroxybenzanthrone
3-hydroxybenzophenone
3-hydroxydiphenyl
4-hydroxydiphenyl
3-hydroxyfluorenone
4-hydroxyfluorenone
6-hydroxy-3-methyl coumarine
4-hydroxyfluoranthrene
3-hydroxy-1,2-benzanthrene
Bz-3-hydroxybenzanthrone
Hydroquinone-monomethyl ether
4'-hydroxy-4-methyldiphenyl
4'-hydroxydiphenyl
Hydroxyphenylene
1-hydroxyphenanthrene
2-hydroxyphenanthrene
3-hydroxyphenanthrene
4-hydroxyphenanthrene
9-hydroxyphenanthrene
p-Hydroxyphenyl benzyl ether
4-hydroxy stilbene
3-hydroxy chrysene 4-hydroxy chrysene
5-hydroxy chrysene
1-hydroxy perylene
2,3-dichlorophenol
2,4-dichlorophenol
2,5-dichlorophenol
2,6-dichlorophenol
3,4-dichlorophenol
3,5-dichlorophenol
Eugenol
Guaiacol
Veratrol
2-methoxy-4-methylphenol
p-Hydroxybiphenyl
p-Tert.-amylphenol
p-(1,1,3,3-tetramethylbutyl)-phenol
1-hydroxyanthracene
2-hydroxyanthracene
9-hydroxyanthracene
9-phenanthrol
2-hydroxyfluorene
5-hydroxy-1,2,3,4-tetrahydronaphthalene
6-hydroxy-1,2,3,4-tetrahydronaphthalene The alkali metal hydroxides which may be employed are lithium hydroxide, potassium hydroxide, sodium hydroxide, and the like. For practical purposes, we prefer to employ potassium hydroxide because of the greater solubility of the potassium salt of the phenol in excess phenol.

Our improved process will be more fully described in conjunction with the following examples. It is to be understood, however, that the examples are given by way of illustration and the invention is not to be limited by the details set forth therein.

EXAMPLE I

Vinyl phenyl ether

A stainless steel, 1-liter autoclave was charged with 376 grams (4 mols) of phenol and 112.8 grams (2.01 mols, 30 per cent by weight of phenol) of potassium hydroxide. The autoclave was sealed, pressure-tested for leaks, and purged 3 times with dry nitrogen and twice with propane. The autoclave was then sealed and heated to 185° C. with agitation. Propane was then introduced to a pressure of 70 p. s. i. g. (pounds/square inch-gauge pressure). Acetylene was added to 200 p. s. i. g., and the reaction was allowed to run for 10 hours at 185° C. The autoclave was allowed to cool and the gases vented. The product was discharged and subjected to steam distillation. The organic layer was separated from the distillate and dried over anhydrous sodium sulfate. Distillation of the product at atmospheric pressure over 2 grams of sodium carbonate gave 318 grams or 67% of theory of vinyl phenyl ether of the following properties: boiling point 154–155.5° C., $n_D^{25}$ 1.519; and $D_4^{25}$ 0.97 gram per ml.

The carbon and hydrogen analyses showed the following results:

C calculated_____ 79.97%   H calculated_____ 6.71%
C found_____ 79.92%   H found_____ 6.78%

The vinyl ether content was 99.8% and free phenol was 0.0%.

While utilizing the same equipment, technique, and conditions described in Example I, but using a potassium hydroxide concentration of 40% by weight of phenol present, the yield was only approximately 60%. Under the same conditions, but using a potassium hydroxide concentration of 20% by weight of phenol present, the yield was only 30%. For a concentration of 10% by weight of phenol present, only traces of the desired product are obtained. A catalyst concentration of 3% which, in most cases, works very well in the vinylation of alcohols, gave no indication of any reaction when applied to phenol and phenolic compounds.

EXAMPLE II

Vinyl p-chlorophenyl ether

Using the same equipment, conditions and techniques described in Example I, 387 grams (3 mols) of p-chlorophenol and 116 grams (2.04 mols, 30% by weight of p-chlorophenol) of potassium hydroxide were submitted to the vinylation reaction. Processing of the reaction mixture yielded 244 grams of the ether with the following properties: boiling point 90° C./20 mm.; $n_D^{25}$ 1.538; and $D_4^{25}$ 1.135.

EXAMPLE III

Vinyl-2,4-dichlorophenyl ether

Using the equipment, conditions and techniques described in Example I, 326 grams (2 mols) of 2,4-dichlorophenol and 97.8 grams (1.7 mols or 30% by weight of phenol present) of potassium hydroxide were submitted to the conditions of vinylation. Processing of the reaction mixture yielded the ether having the following physical properties: boiling point 105–107° C./14 mm.; $n_D^{25}$ 1.555; and $D_4^{25}$ 1.276.

EXAMPLE IV

Using the equipment, conditions and techniques described in Example I, 244 grams (1.63 mols) of p-tert.-butylphenol and 73.2 grams (1.31 mols or 30% by weight phenol present) of potassium hydroxide were submitted to the conditions of vinylation. Processing of the crude reaction mixture yielded 129.5 grams (0.735 mol) of the ether having the following properties: boiling point 113.5° C./20 mm.; $n_D^{25}$ 1.507; and $D_4^{25}$ 0.929.

The carbon and hydrogen analyses showed the following results:

C calculated_____ 81.72   H calculated_____ 9.15
C found_____ 81.65   H found_____ 9.12

By replacing the phenol with other phenols and utilizing the same reaction conditions as in Example I, the following vinyl and aryl ethers may be prepared:

| Name | Formula | Mol. W. | Boiling Point |
|---|---|---|---|
| Vinyl o-tolyl ether | $C_9H_{10}O$ | 134.17 | 169° C. |
| Vinyl m-tolyl ether | $C_9H_{10}O$ | 134.17 | 175° C. |
| Vinyl p-tolyl ether | $C_9H_{10}O$ | 134.17 | 177° C. |
| Vinyl 2-methoxyphenyl ether | $C_9H_{10}O_2$ | 150.17 | 202° C. |
| Vinyl 1-naphthyl ether | $C_{12}H_{10}O$ | 170.20 | 258° C. |
| Vinyl 2-naphthyl ether | $C_{12}H_{10}O$ | 170.20 | 264° C. |
| Vinyl 2-isopropyl-5-methyl phenyl ether | $C_{12}H_{16}O$ | 176.25 | 100° C./14 mm. |
| Vinyl 5-isopropyl-2-methyl phenyl ether | $C_{12}H_{16}O$ | 176.25 | 218° C. |
| Vinyl 2,4-dichlorophenyl ether | $C_8H_6Cl_2O$ | 189.03 | 104° C./14 mm. |

While we have disclosed the preferred embodiments of our invention and the preferred modes of carrying the same into effect, it will be readily apparent to those skilled in this art that many variations may be made therein without departing from the spirit thereof. Accordingly, the scope of our invention is to be limited solely by the following claims.

We claim:

1. In the process of preparing vinyl aryl ethers characterized by the following general formula:

$$CH_2=CH-O-R$$

wherein R represents the residual nuclear radical of a monohydric phenol, the improvement which consists of heating an alkali stable monohydric phenol with 25–30% by weight of the phenol of potassium hydroxide in the presence of a mixture of acetylene and propane at a temperature ranging between 175–190° C. and at a pressure of not more than 15 atmospheres.

2. In the process of preparing vinyl phenyl ether, the improvement which consists of heating two molecular equivalents of alkali stable phenol and one molecular equivalent of potassium hydroxide in the presence of a mixture of acetylene and propane at a temperature of 185° C. and a pressure of approximately 14 atmospheres.

3. In the process of preparing vinyl p-chlorophenyl ether, the improvement which consists of heating one molecular equivalent of alkali stable p-chlorophenol and 0.66 molecular equivalent of potassium hydroxide in the presence of a mixture of acetylene and propane at a temperature of 185° C. and a pressure of approximately 14 atmospheres.

4. In the process of preparing vinyl-2,4-dichlorophenyl ether, the improvement which consists of heating two molecular equivalents of alkali stable 2,4-dichlorophenol and 1.7 molecular equivalents of potassium hydroxide in the presence of a mixture of acetylene and propane at a temperature of 185° C. and a pressure of approximately 14 atmospheres.

5. In the process of preparing vinyl p-tert.-butylphenyl ether, the improvement which consists of heating one molecular equivalent of alkali stable p-tert.-butylphenol and 0.8 molecular equivalent of potassium hydroxide in the presence of a mixture of acetylene and propane at a temperature of 185° C. and a pressure of approximately 14 atmospheres.

6. In the process of preparing vinyl 1-naphthyl ether, the improvement which consists of heating one molecular equivalent of alkali stable α-naphthol and 0.77 molecular equivalent of potassium hydroxide in the presence of a mixture of acetylene and propane at a temperature of 175° C. and a pressure of approximately 14 atmospheres.

References Cited in the file of this patent

UNITED STATES PATENTS

| Number | Name | Date |
|---|---|---|
| 1,959,927 | Reppe | May 22, 1934 |
| 2,066,076 | Reppe et al. | Dec. 29, 1936 |
| 2,354,632 | Wolfram et al. | July 25, 1944 |

FOREIGN PATENTS

| Number | Country | Date |
|---|---|---|
| 430,590 | Great Britain | June 21, 1935 |
| 656,556 | Great Britain | Aug. 29, 1951 |